UNITED STATES PATENT OFFICE.

GEORGES DARZENS, OF PARIS, FRANCE.

MANUFACTURE OF CERTAIN ALDEHYDES.

No. 830,213.     Specification of Letters Patent.     Patented Sept. 4, 1906.

Application filed October 6, 1904. Serial No. 227,472. (Specimens.)

*To all whom it may concern:*

Be it known that I, GEORGES DARZENS, of Paris, France, have invented a new and useful Manufacture of Certain Aldehydes and Intermediate Products, which invention is fully set forth in the following specification.

This invention relates to a manufacture of aldehydes by decomposing substituted oxyacrylic acids of formula

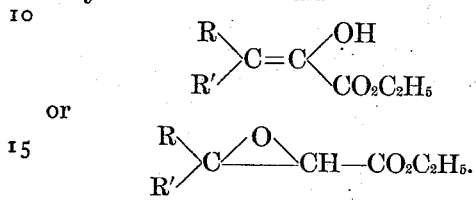

These aldehydes, which are very odoriferous, are particularly applicable to perfumery, confectionery, and like purposes.

The manufacture consists, essentially, in condensing a fatty or aromatic ketone or generally a compound containing a CO group in its molecule with an ester of chloro-bromo or iodo-acetic acid in presence of sodium, sodium ethylate, or any other alkaline condensing agent.

The ester, which is formed according to the reaction

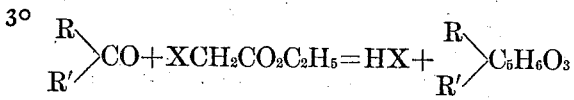

is then saponified by any usual process, and the acid obtained is decomposed either by merely raising the temperature or by distilling under reduced pressure or in any other suitable manner.

The same result may be attained by condensing a compound of the form R-CO-R' with other derivatives of glycollic acid.

Example I: A mixture of eight hundred and fifty grams of methylnonyl ketone and six hundred and twenty grams of ethyl chloracetate is treated with a solution of one hundred and twenty grams of sodium in two liters of absolute alcohol. After these materials have been in contact for some hours the mass is treated with water and the oil decanted and distilled in a vacuum. A condensation product boiling at 165° to 170° centigrade under sixteen millimeters pressure, having a specific gravity of 0.836 at 0° centigrade, having a refractive index of 1.4245 for the D line at 28° centigrade, is thus isolated. The ester thus obtained is saponified and then distilled in a vacuum. It readily yields methylnonylacetaldehyde, boiling at 119° to 122° under sixteen millimeters pressure and giving a semicarbazone melting at 85° centigrade.

Example II: A mixture of two hundred and fifty grams of paratolylmethyl ketone and two hundred and forty grams of ethyl chloracetate is treated with a solution of forty-five grams of sodium in a liter of absolute alcohol. The product is a liquid boiling at 160° to 164° centigrade under sixteen millimeters pressure. When saponified and decomposed, it yields paramethylhydratropic aldehyde boiling at 107° to 108° centigrade under nineteen millimeters pressure and giving a semicarbazone melting at 159° to 160° centigrade.

Example III: A mixture of two hundred and fifty grams of benzylacetone and two hundred and ten grams of ethyl chloracetate is treated with a solution of forty grams of sodium in a liter of absolute alcohol. The condensation product is a liquid boiling at 175° to 180° centigrade under sixteen millimeters pressure, which when saponified and decomposed yields methylphenylbutylic aldehyde boiling at 129° to 130° centigrade under nineteen millimeters pressure and giving a semicarbazone melting at 70° to 72° centigrade.

Having now particularly described and ascertained the nature of my said invention and in what manner the same is to be performed, I declare that what I claim is—

1. The process of making aldehydes, consisting in condensing a body containing a CO group with an ester of a halogen derivative of a fatty acid, and transforming the resultant product into an aldehyde.

2. The process of making aldehydes, consisting in condensing a body containing a CO group with ethylmonochloracetic ester, and transforming the resultant product into an aldehyde.

3. An aldehyde, methylnonylacetaldehyde derived from condensation of methylnonylketon with ethylmonohalogenaceticester, beng an odoriferous substance, having a boiling-point of 119° to 122° centigrade under sixteen millimeters pressure, having a specific gravity of 0.836 at 0° centigrade, having a refraction index of 1.4245 for the D line at 28° centigrade, and forming a semicarbazone whose melting-point is 85° centigrade.

In witness whereof I have hereunto signed my name, this 27th day of September, 1904, in the presence of two subscribing witnesses.

GEORGES DARZENS.

Witnesses:
 JULES ARMENGAUD, Jeune,
 RENI ARMENGAUD.